(12) United States Patent
Olesen et al.

(10) Patent No.: US 11,787,131 B2
(45) Date of Patent: Oct. 17, 2023

(54) METHOD FOR FABRICATING A MEMBER IN A RESIN-INFUSION-BASED CASTING PROCESS AND WIND TURBINE BLADE

(71) Applicant: Siemens Gamesa Renewable Energy A/S, Brande (DK)

(72) Inventors: Bendt Olesen, Klarup (DK); Samuel Robert Van Oosterom, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/355,354

(22) Filed: Jun. 23, 2021

(65) Prior Publication Data

US 2021/0402717 A1 Dec. 30, 2021

(30) Foreign Application Priority Data

Jun. 25, 2020 (EP) .................................... 20182222

(51) Int. Cl.
*B29C 70/44* (2006.01)
*B29C 70/48* (2006.01)
(Continued)

(52) U.S. Cl.
CPC ............ *B29C 70/443* (2013.01); *B29C 70/12* (2013.01); *B29C 70/54* (2013.01); *G01K 1/024* (2013.01);
(Continued)

(58) Field of Classification Search
CPC .. B29C 70/48; B29C 70/443; B29L 2031/085
See application file for complete search history.

(56) References Cited

U.S. PATENT DOCUMENTS 6,957,777 B1 * 10/2005 Huang ............. G06K 19/07724
235/487
8,196,452 B2 * 6/2012 Nelson .................... B29C 43/58
73/37
(Continued)

FOREIGN PATENT DOCUMENTS

CN 102015264 A 4/2011
CN 102186646 A 9/2011
(Continued)

OTHER PUBLICATIONS

Machine translation of DE 10 2018 104 519 A1 dated Aug. 2019. (Year: 2019).*
(Continued)

*Primary Examiner* — Robert B Davis
(74) *Attorney, Agent, or Firm* — Schmeiser, Olsen & Watts LLP

(57) ABSTRACT

A method for fabricating a member in a resin-infusion-based casting process, in which at least one component forming the member is infused with a resin, including the steps:
Providing a mold, the at least one component, the resin, at least one measurement device and at least one sensing device, wherein the sensing device has at least one property which changes measurably with temperature and/or when the sensing device comes into contact with the resin,
attaching the at least one sensing device to an inner surface of the mold and/or to the component,
arranging the component inside the mold,
providing the resin to at least one inlet of the mold, and wirelessly measuring and evaluating the property of the sensing device with the measurement device for monitoring a temperature and/or a distribution of the resin in the mold and/or in the component, is provided.

15 Claims, 5 Drawing Sheets

(51) Int. Cl.
| | |
|---|---|
| *B29C 70/12* | (2006.01) |
| *B29C 70/54* | (2006.01) |
| *G01K 1/024* | (2021.01) |
| *G06K 7/10* | (2006.01) |
| *G06K 19/07* | (2006.01) |
| *B29K 309/08* | (2006.01) |
| *B29L 31/08* | (2006.01) |

(52) U.S. Cl.
CPC ..... *G06K 7/10366* (2013.01); *G06K 19/0723* (2013.01); *B29K 2309/08* (2013.01); *B29L 2031/085* (2013.01)

(56) References Cited

U.S. PATENT DOCUMENTS

| | | |
|---|---|---|
| 9,862,144 B2 | 1/2018 | Lane et al. |
| 2007/0236354 A1 | 10/2007 | Green |
| 2008/0150701 A1 | 6/2008 | Randmae |
| 2009/0243128 A1 | 10/2009 | Nelson et al. |
| 2010/0326584 A1 | 12/2010 | Schibsbye |
| 2011/0164987 A1 | 7/2011 | Grabau |
| 2015/0174835 A1 | 6/2015 | Hansen et al. |
| 2018/0104909 A1 | 4/2018 | Lane et al. |
| 2018/0319046 A1 | 11/2018 | Johnson et al. |
| 2019/0219028 A1 | 7/2019 | Pedersen |

FOREIGN PATENT DOCUMENTS

| | | |
|---|---|---|
| CN | 104619479 A | 5/2015 |
| CN | 110039802 A | 7/2019 |
| DE | 102017107908 A1 | 10/2018 |
| DE | 102018104519 A1 | 8/2019 |
| DE | 102018114578 A1 | 12/2019 |
| WO | 2011137909 A1 | 11/2011 |

OTHER PUBLICATIONS

Internetpage: "https://www.netzsch-thermal-analysis.com/en/products-solutions/dielectric-analysis/dea-288-ionic/" retrieved Nov. 23, 2021. 12 pages.

Extended European Search Report in related European Patent Application No. 20182222.8 dated Nov. 20, 2020. 7 pages.

Van Oosterom, S., et al., "An objective comparison of common vacuum assisted resin infusion processes," Composites Part A 125 (2019) 105528; 15 pages.

Marin, Emmanuel, et al., "Liquid Resin Infusion process monitoring with superimposed Fibre Bragg Grating sensor," Polymer testing, 31 (2012), p. 1045-1052; 8 pages.

Wang Liqiang et al.: "RFID Technology and application", ISBN 978-7-5618-6312-1, Tianjin University Press, pp. 34-35, Sep. 1, 2019.

Liu Qingjun et al.:"Wearable and Portable Biochemical Sensing Detection Technology", P24-25 World Book Publishing Xi'an Co., Ltd , Apr. 2019.

* cited by examiner

METHOD FOR FABRICATING A MEMBER IN A RESIN-INFUSION-BASED CASTING PROCESS AND WIND TURBINE BLADE

CROSS-REFERENCE TO RELATED APPLICATIONS

This application claims priority to European Patent Application No. 20182222.8, having a filing date of Jun. 25, 2020, the entire contents of which are hereby incorporated by reference.

FIELD OF TECHNOLOGY

The following relates to a method for fabricating a member in a resin-infusion-based casting process, in which at least one component forming the member is infused with a resin. Furthermore, the following relates to a wind turbine blade.

BACKGROUND

In resin-infusion-based fabrication processes, in particular in vacuum-assisted resin infusion (VARI) manufacturing processes, it is desirable to monitor a position of a flow front of the resin during the infusion to achieve a high quality of a fabricated member and to obtain a robust casting process. In particular in situations, where multiple inlets for the resin are used, knowing the position of the flow front is a prerequisite for a timing of the opening of the inlets and for preventing an entrapment of air inside the mold, which would lead to areas of unsaturated reinforcement textile in the finished component.

The position of a resin flow front can be determined using so-called gossip ports, which are holes that are drilled through the enclosed mold comprising transparent tubes connected to vacuum tracks for enabling a visual observation of resin flowing out of the mold and into the vacuum track. However, these gossip ports have the disadvantage that they reduce a process robustness due to their tendency to leak air back into the mold. Furthermore, additional resin and/or components for the gossip port are required for each casting process.

Also, the usage of pressure transducers and/or capacitive or dielectric sensors require holes in the mold for cables connecting the sensors and therefore bear the risk of leaking air into the mold at their mounting positions. Furthermore, such sensors require cleaning after the casting process and they are prone to damage during the casting process, in particular by the resin, so that their life span in fabrication processes may be reduced.

Other approaches, like optical fibers such as fiber Bragg gratings can be used to monitor resin arrival along fiber strands integrated into the reinforcing structures infused by the resin. However, the fragile nature of these fibers makes them prone to damages. They also necessitate holes in the mold for establishing a connection to a measurement device and they require complex signal processing. In addition, they are not suitable for integration into fabrication processes due to the arrangement of the optical fibers in the reinforcement structures of the casted component.

In WO 2011/137909 A1, a method for producing a wind turbine component having one or more wireless devices embedded therein is described. The method comprises the steps of providing fiber reinforcement material in a mold and adding the one or more wireless devices to a curable resin, which is introduced together with the wireless devices into the mold such that the resin and the wireless devices are infused through the fiber reinforcement material.

US 2009/0243128 A1 describes a system for collecting data during vacuum molding of a composite part using a mold including an air tight, flexible membrane sealed to a tool. The system comprises a plurality of membrane sensors coupled with the interior of the mold at different locations over the part.

From US 2008/0150701 A1, an apparatus for injection molding of plastic articles with integral RFID tags is known. The apparatus includes an injection molding machine comprising a melt reservoir and an RFID injection element. For creating the molded plastic articles, the RFID tags are injected into liquid plastic resin during the injection molding process.

SUMMARY

It is therefore an aspect of the present invention to provide a method for fabricating a member in a resin infusion-based casting process which facilitates the monitoring of a position of the resin in the mold.

According to the embodiment of the present invention, this problem is solved by a method as initially described, wherein the method comprises the steps:

Providing a mold, the at least one component, the resin, at least one measurement device and at least one sensing device, wherein the sensing device has at least one property which changes measurably with temperature and/or when the sensing device comes into contact with the resin, attaching the at least one sensing device to an inner surface of the mold and/or to the component, arranging the component inside the mold, providing the resin to at least one inlet of the mold, and wirelessly measuring and evaluating the property of the sensing device with the measurement device for monitoring a temperature and/or a distribution of the resin in the mold and/or in the component.

By measuring the property of the sensing device of the measurement device, a temperature of the sensing device can be determined. Additionally or alternatively, a contact of the sensing device to the resin can be detected by the change in the property of the sensing device caused by the contact of the sensing device to the resin. When the sensing device comes into contact with the resin, hence when the resin arrives at the position of the sensing element, the property of the sensing devices changes and the change in the property can be measured wirelessly using the measurement device.

The measurement device is adapted to wirelessly measure the at least one property of the sensing device that changes measurably with temperature and/or when the sensing device comes into contact with the resin. As resin, for instance an epoxy resin or polyurethane may be used. The measuring and the evaluating are in particular repeated over time to measure the temperature and/or to detect a contact of the resin to the one or more sensing devices and therefore to detect an ingress of the resin at the location of the sensing device, or the interior of the mold, respectively. For the measurement of the temperature and/or the contact to the resin, the same property or two or more different properties of the sensing device may be measured by the measurement device.

By attaching the at least one sensing device to an inner surface of the mold and/or to the component, which is infused by the resin for fabrication of the member, a direct positioning of the sensing device to the interior of the mold, or the component inside the mold, respectively, is obtained. The wireless measurement of the property has the advantage, that the drilling of holes inside the mold and/or the provision of connections between measuring equipment and the sensing device can be avoided. The lack of need for cables eliminates the need for mold penetrations that result in leaks that are detrimental to the quality of the fabricated member. Furthermore, the attachment of the sensing device to the interior of the mold and/or to the component allows for repositioning the sensors for each single fabrication process as well as for adjusting the number of sensing devices utilized in each fabrication process. This in particular facilitates the fabrication of prototypes and/or of productional test runs, which may require a higher number of measurement points, or sensing devices, used respectively.

An attachment of one or more sensing devices to the mold and/or the component providing a spatial resolution, so that a temperature distribution and/or the current position of the resin, or a depth of the infusion of the resin into the mold and/or into the component can be detected. The component may be in particular a component that soaks the resin, for instance a textile reinforcement component, in particular a glass fiber mat or the like. After casting the member, the at least one sensing device may remain inside the member and/or within a surface of the member. It is also possible that the at least one sensing device is removed from the member after the casting process.

It is in particular possible, that the at least one measurement device is located exterior to the mold in a position, in which one or more of the sensing devices, in particular all sensing devices inside the mold, can be measured, so that in particular an distribution of the resin in the entire interior of the mold can be monitored. The sensing device may be able to detect a temperature and/or a contact with the resin, or to exhibit a measurable change in its property, respectively, in a temperature range between at least 0° C. and 90° C., between 0° C. and 150° C. The sensing device and/or the measurement device comprises a temperature accuracy of at least 1° C. by evaluating the property of the sensing device.

In an exemplary embodiment of the present invention, a plurality of sensing devices is arranged at different locations at the mold and/or at the component. By providing a plurality of sensing devices at the mold and/or at the component, a spatial resolution of the temperature distribution and/or the resin distribution into the mold and/or into the component can be obtained. The sensing devices may be attached prior to the casting to the mold and/or to the component. It is also possible that in particular a sensing device attached to the mold is attached in such manner that it remains in its position after fabricating the member so that it may be reused in a subsequent casting process.

After arranging the component in the mold, at least one further component and/or a supporting element is arranged on the component, wherein at least one further sensing device is attached to the further component and/or to the supporting element, in particular opposite to the sensing device or opposite to at least one of the sensing devices attached to the mold and/or the component. By providing a sensing device also to a further component placed inside the mold, also the infusion of the resin into the further component can be monitored. This is in particular useful, when between the component and the further component a rigid core component is placed, which is not infused by the resin, so that the component and the further component are separated, so that they may become infused by the resin differently. Also an attachment of a further sensing device to a supporting element, for instance a mandrel, used to support one or more components in the mold during the casting process, is possible.

The sensing device attached to the further component may in particular be arranged opposite to the sensing device or to at least one of the sensing devices attached to the mold and/or the component, so that the measurement of the property of the sensing device attached to the mold and/or the component as well as of the sensing device attached the further component is facilitated and may be conducted by one measurement device due to the adjacent positioning of the sensing devices.

In an exemplary embodiment of the present invention, the at least one measurement device is arranged to an outer surface of the mold, in particular opposite to the sensing device and/or to at least one of the sensing devices, and/or at least one hand held device is used as a measurement device. It is also possible that a combination of hand held devices and measurement devices arranged on an outer surface of the mold, hence on an exterior of the mold, are used. The at least one measurement device arranged at the outer surface of the mold may for instance be permanently installed to the mold, wherein additional hand held devices can be used in processes, in which an additional number of sensing devices is used to monitor a resin flow front in the interior of the mold.

The measurement device may be able to correct a measured value correlated to the property of the sensing device for the presence of an obstruction between the measurement device and the sensing device. Such an obstruction may be for instance a heating tube arranged on an outer surface of the mold used for curing the resin after the resin infusion into the mold, or the component, respectively. Such a heating tube may consist for instance of a metal like copper and therefore may influence the wireless measurement of the property of the sensing device. However, by applying a corresponding correction function for instance in the measurement device, the influence of the obstruction may be compensated at least partly.

In an exemplary embodiment of the present invention, the at least one sensing device is passively powered, in particular by energy provided by the measurement device in form of an electromagnetic field. By using a sensing device, which is passively powered, a simple and cheap construction of the sensing devices is possible facilitating the usage of a plurality of sensing devices in a fabrication process. By passively powering the at least one sensing device, in particular by energy provided from the measurement device, no additional energy sources have to be provided with the sensing devices. Furthermore, also no cable connections are required to provide power to the at least one sensing device. Also, a combination of passively powered sensing devices and actively powered sensing devices is possible, in particular if for some of the sensing devices are arranged in a larger distance to the measurement device, so that an active transmission of actively powered sensing devices may be used to bridge the distance.

A radio frequency identification element is used as sensing device and a radio frequency identification reader is used as measurement device. Radio frequency identification (RFID) elements have the advantage that they are cheap to produce. Furthermore, they may be passively powered, in particular by a RFID reader, so that no battery sources are required, which additionally reduces the size and the cost of the sensing devices. Furthermore, simple signal processing and a simple data collection is possible using RFID elements as sensing devices and RFID readers as measurement devices, respectively.

In an exemplary embodiment of the present invention, a radio frequency impedance of the radio frequency identification element, in particular of an antenna of the radio frequency identification element, is used as property of the radio frequency identification element. A contact of the RFID element, or its antenna, respectively, to the resin causes a change in the impedance of the RFID element, or its antenna, respectively. Furthermore, the impedance may also depend on temperature, so that also a temperature measurement becomes possible. This change can be detected wirelessly by the measurement device, or the RFID reader, respectively. A change of a radio frequency (RF) impedance of the RFID element may for instance be determined by the measurement device through evaluating an adaptive RF impedance setting used to match the sensing device antenna to the RFID reader.

The at least one sensing device comprises a temperature measurement unit, which determines a temperature information corresponding to a temperature of the sensing device, an identification unit, which provides an identification information specific to the sensing device, a pressure measurement unit, which determines a pressure information corresponding to a pressure acting on the sensing device, and/or a capacity measurement unit, which determines a capacitance information corresponding to an electrical capacitance of a vicinity of the sensing device, wherein the measurement device reads the temperature information, the identification information, the pressure information and/or the capacitance information from the at least one sensing device.

By providing more information from the sensing device, for instance about a pressure inside the mold and/or of a capacity in a vicinity of the sensing device, additional data can be obtained during the fabrication process. The temperature measurement unit can be used for a temperature measurement alternatively or additionally to a temperature-dependent change of the or a property of the sensing device. By providing an identification information specific to one sensing device, multiple sensing devices may be read out for instance by one single measurement device. The different information obtained from the sensing devices and/or the properties evaluated for determination of the temperature and/or of the ingress of the resin may be matched to the specific sensing devices, or the location of the specific sensing devices, respectively, so that also a matching of the measured information and/or of a presence of the resin to specific positions becomes easily possible.

A RFID element that is used as sensing device may comprise a chip and an antenna, wherein the chip may comprise the temperature unit, the identification unit, the pressure measurement unit and/or the capacitance measurement unit. The respective information measured by these units may be transmitted from the RFID element to the RFID reader during a read-out process.

In an exemplary embodiment of the present invention, the at least one sensing device comprises a flexible and/or adhesive attachment portion, in particular a flexible substrate with an adhesive surface, wherein the attachment portion is used to attach the sensing device to the inner surface of the mold and/or to the component. A flexible and/or adhesive attachment portion facilitates the attachment of the sensing element to the mold and/or to the component, since the shape of the attachment portion, or in case of a flexible substrate, also the shape of the sensing device may adapt to the shape, in particular to a curvature of the inner surface of the mold, or a shape of a surface of the component, respectively.

A sensing device provided as a RFID element may comprise for instance a flexible circuit board, on which a sensor and/or an antenna of the RFID element are realized. Also, the usage of a flexible foil as attachment portion and/or as substrate for the sensing device is possible, so that for instance an RFID element with a sticker tag type structure can be used. The attachment portion, or the substrate, respectively, may comprise a thickness of 0.1 mm to 5 mm, in particular of 1.5 mm. The length and/or the width of the attachment portion, or the substrate, respectively, may be between 10 mm and 200 mm, in particular 150 mm.

The at least one measurement device is connected to a computing device, wherein the computing device controls a heater of the mold in dependence of a temperature measured using the sensing device and/or determines a resin distribution information describing the resin distribution in the mold and/or in the at least one component, and/or wherein the computing device controls at least one valve of a further inlet of the mold used for providing resin to the mold.

The mold may comprise a heating device which is for instance used to heat the mold during the resin infusion process and/or during a curing process after resin infusion. The computing device may control the heater of the mold in dependence of a temperature measured using the sensing device during the resin infusion and/or during the curing process.

The computing device may comprise a display unit on which the resin distribution in the mold is displayed. Additionally, when additional information like a temperature information, a pressure information, a capacitance information and/or an identification information is provided by the at least one sensing device, also this information can be processed in the computing unit and/or displayed by the display unit of the computing unit for facilitating a control of the casting process. It is also possible that the computing unit provides the resin distribution information and/or one or more of the other information to further computing units and/or to data storage devices.

The knowledge about the distribution of the resin inside the mold can be used for processes, in which a plurality of inlets for providing the resin to the interior of the mold are used. By providing a computing unit, which determines the resin distribution information, an automatic control of these inlets, or of valves of these inlets, respectively, becomes possible, so that the opening of the further inlets can be controlled dependent of the resin distribution information, so that for instance an inclusion of air in the interior of the mold and/or in the component may be prevented.

In an exemplary embodiment of the present invention, the mold comprises at least two parts completely enclosing the interior of the mold. Due to the sensing devices and the wirelessly measuring of the at least one sensing device by the measurement device, the usage of a so-called enclosed mold, which completely encloses the interior of the mold becomes possible while determining the position of the resin inside the mold. By using the sensing devices, the resin distribution or the position of a flow front of the resin inside the mold becomes possible without the need for a visual inspection, so that in particular non-transparent molds, for instance fiberglass molds, can be used.

A glass fiber mat is used as component and/or as further component and/or a core component is arranged in between the component and the further component, wherein the core component is in particular balsa wood or a polyethylene terephthalate (PET) foam. The fiber glass mat may have for instance a thickness 20 mm to 30 mm. The core component may have for instance a thickness between 15 mm to 100 mm.

In an exemplary embodiment of the present invention, a vacuum is applied to at least the interior of the mold during provision of the resin. Using a vacuum in the resin-infusion based fabrication procedure, the intrusion of the resin into the at least one component can be improved by removing the air from the mold and/or the component.

As a member, a wind turbine blade is fabricated. In particular for fabrication of large members, like for instance wind turbine blades, a large area and a volume has to be infused by the resin for creating the member in the casting process. Therefore, the monitoring of the resin distribution inside the mold using the sensing devices is in particular feasible for the fabrication of large members like wind turbine blades.

A wind turbine blade according to the embodiment of the present invention is fabricated in a method according to the present invention.

The advantages and details of the method according to the present invention apply correspondingly to the wind turbine blade according to the present invention.

BRIEF DESCRIPTION

Some of the embodiments will be described in detail, with reference to the following figures, wherein like designations denote like members, wherein.

DETAILED DESCRIPTION

Figure 1:
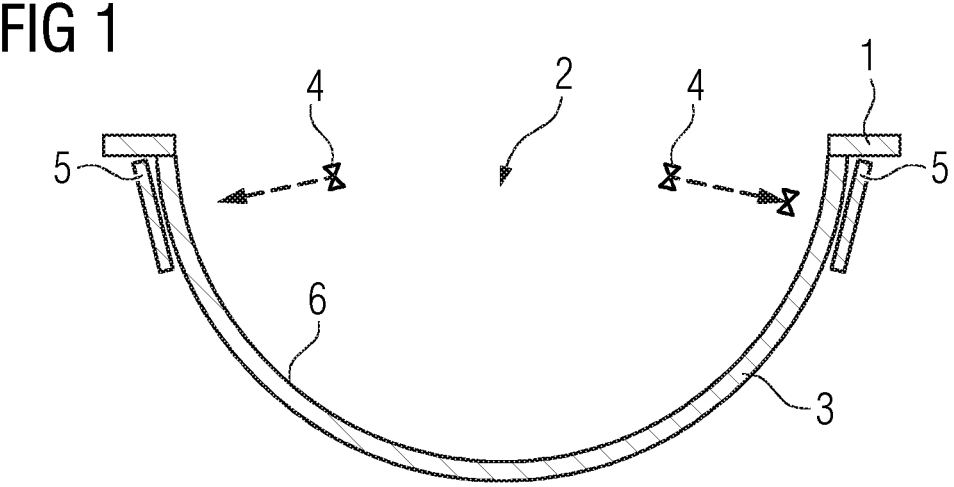
FIG. 1 depicts a cut view of a mold illustrating a step of an embodiment of a method according to the present invention.

In FIGS. 1-7, different steps of an embodiment of a method according to the present invention are shown. In FIG. 1, a mold 1 provided for fabricating a member, for instance a wind turbine blade, in a resin-infusion-based casting process is shown. The mold 1 is an enclosed mold comprising at least two parts completely enclosing an interior 2 of the mold 1. In a first step of the method according to the present invention, a lower part 3 of the mold 1 is provided. To an inner surface 6 of the mold 1, two sensing devices 4 are attached. Opposing to each of the sensing devices 4, on an outer surface of the mold 1, a measurement device 5 is arranged.

The sensing devices 4 are radio frequency identification (RFID) elements, which are positioned at different locations inside the mold 1 for monitoring a temperature and/or a resin infusion into the mold. The sensing devices 4 comprise a property which changes measurably with temperature and/or when the sensing device 4 comes into contact with the resin provided in the interior 2 of the mold 1. The RFID elements used as sensing devices 4 each comprise an antenna, wherein a radio frequency impedance of the radio frequency identification element changes with temperature and/or when the sensing device 4 comes into contact with the resin.

For wirelessly measuring the changing property of the sensing devices 4, the measurement devices 5 are radio frequency identification readers (RFID readers), which can read out the at least one property of the sensing devices 4 that changes with temperature and/or upon contact of the sensing device 4 with the resin. A change of a radio frequency impedance of the RFID element can for instance be detected by the measurement device 5 to quantify an adaptive RF impedance setting used to match an antenna of the sensing device 4 to the measurement device 5.

The sensing devices 4 are able to operate in a temperature range between at least 0° C. and 90° C., between 0° C. and 150° C. and therefore within a temperature range of resin during infusion and/or during a subsequent curing step. The measurement devices 5 mounted on the outer surface of mold 1 are designed to withstand temperatures reached during a curing process of the resin, for instance temperatures between 0° C. to 90° C.

Each sensing device 4 comprises a flexible and/or adhesive attachment portion, which is provided by a flexible substrate with an adhesive surface, wherein the attachment portion is used to attach the sensing device 4 to the inner surface of the mold 1 and/or to a component 7 placed inside the mold 1. A sensing device 4 provided as a RFID element comprise a flexible circuit board, on which a sensor and an antenna of the RFID element are realized. For instance, RFID elements with a sticker tag type structure can be used. The attachment portion, or the substrate, respectively, comprise a thickness of 0.1 mm to 5 mm, in particular of 1.5 mm. The length and/or the width of the attachment portion, or the substrate, respectively is between 10 mm and 200 mm, in particular 150 mm.

Figure 2:
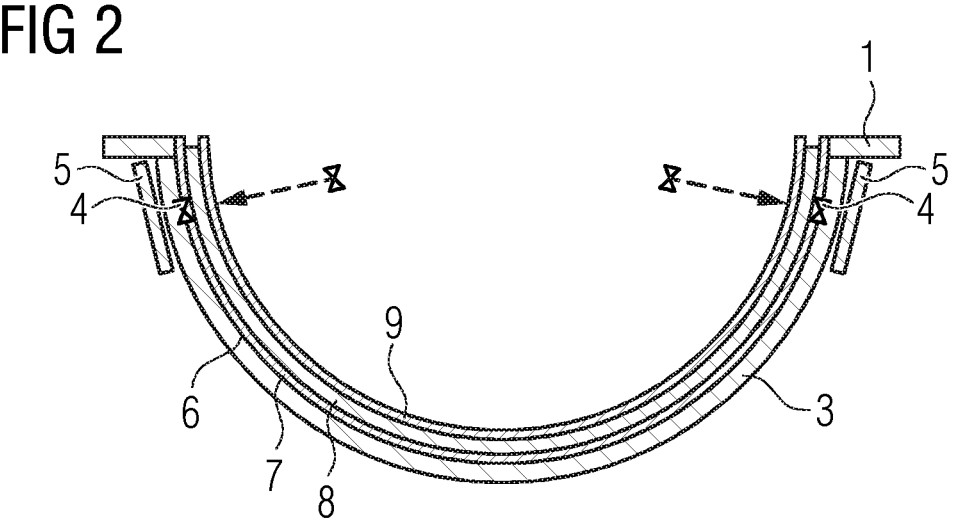
FIG. 2 depicts a cut view of a mold illustrating a step of an embodiment of a method according to the present invention.

In FIG. 2, to the inner surface 6 of the mold 1, at least one component 7 is arranged. The component 7 is for instance a glass fiber mat with a thickness of 20 mm to 30 mm, which is soaked by the resin in the casting process. On top of the component 7 at least one core component 8, which may not be infused by the resin during the process, is placed. The core component 8 can for instance be made of a polyethylene terephthalate (PET) foam or of balsa wood. The core component 8 may have for instance a thickness between 15 mm to 100 mm. On top of the core component 8, a further component 9, which is for instance a glass fiber mat according to the component 7, is arranged. In the fabrication process, as a member consisting of the at least one component 7, the at least one core element 8 and the at least one element 9, a wind turbine blade can be fabricated.

On the further component 9, additional sensing devices 10 are attached, so that during the resin-based infusion process, also a resin infusion into the further component 9 can be measured using the measurement devices 5.

Figure 3:
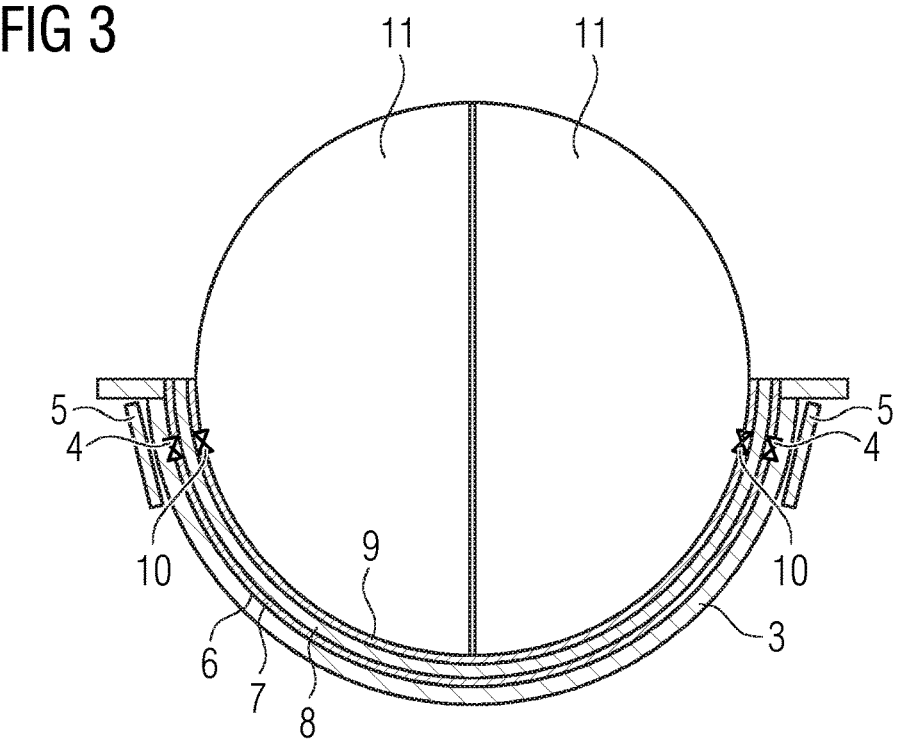
FIG. 3 depicts a cut view of a mold illustrating a step of an embodiment of a method according to the present invention.

As it is depicted in FIG. 3, two mandrels 11 are placed in the interior 2 of the mold 1 as supporting elements for supporting the component 7, the core component 8 and the further component 9 towards each other during the casting process. It is possible that also in between the mandrels 11, one or more further sensing devices 10 are arranged.

Figure 4:
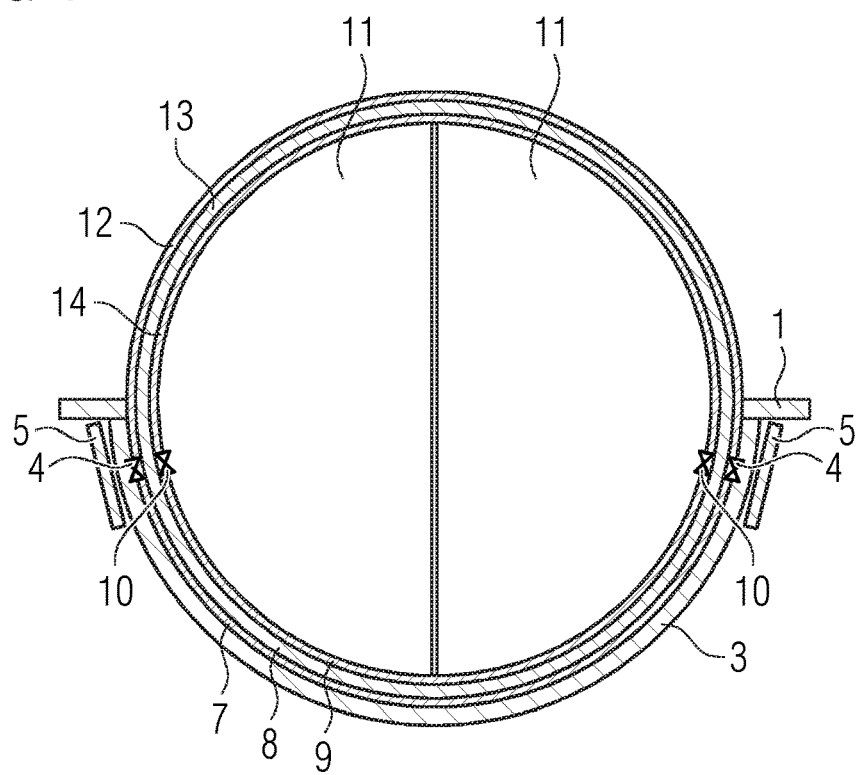
FIG. 4 depicts a cut view of a mold illustrating a step of an embodiment of a method according to the present invention.

In FIG. 4, an additional component 12, an additional core component 13 as well as an additional further component 14 are placed on top of the mandrels 11 for creating the member fabricated in the casting process. The additional component 12 and the additional further component are each a glass fiber mat according to the component 7, or the additional component 9, respectively. It is possible that sensing devices 4 and/or additional sensing devices 10 are attached to the additional component 12 and/or the additional further component 14 as well.

Figure 5:
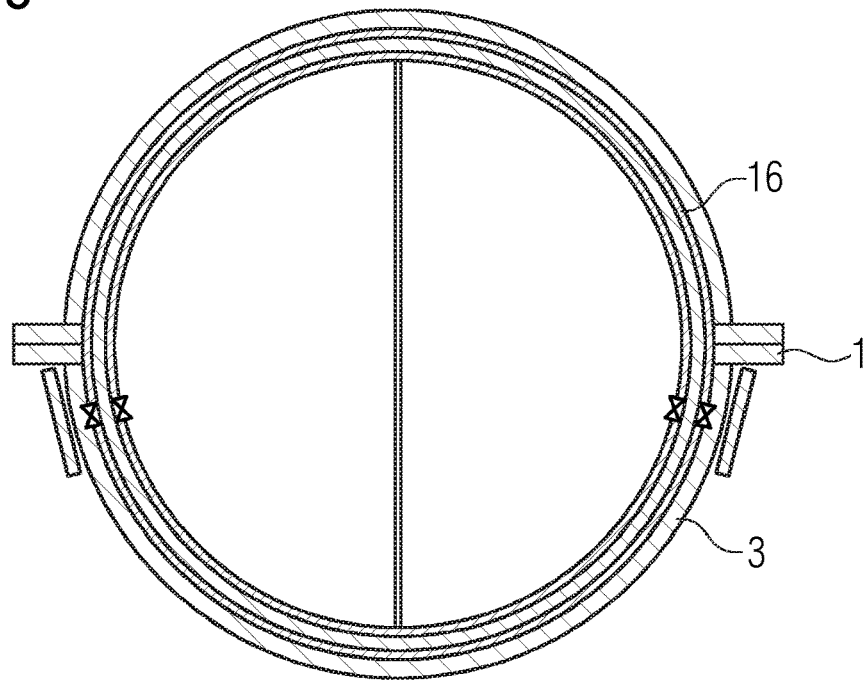
FIG. 5 depicts a cut view of a mold illustrating a step of an embodiment of a method according to the present invention.

As is shown in FIG. 5, an upper part 16 of the mold is then placed on top of the components in the interior 2 of the mold 1 enclosing the entire interior 2 of the mold 1. Afterwards, a vacuum is applied to the interior 2 of the mold 1, so that air inside the interior 2 and/or air inside the components, in particular in the components 7, 12 and the further components 9, 14 provided as textile structures, is removed.

Figure 6:
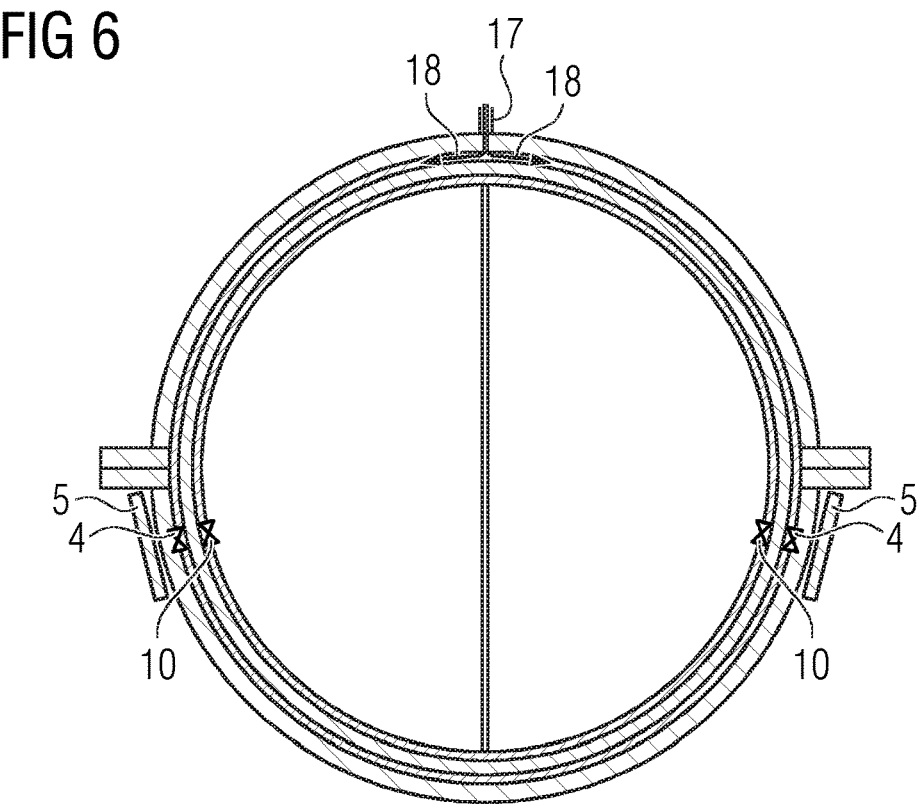
FIG. 6 depicts a cut view of a mold illustrating a step of an embodiment of a method according to the present invention.

Afterwards, as it is depicted in FIG. 6, from an inlet 17 resin is provided to the interior of the mold as depicted by the arrows 18. By using the sensing devices 4, 10, the ingress of the resin into the interior 2 of the mold 1, or the components 7, 9, respectively, can be determined. For instance, when the resin has already reached the position of the sensing devices 4 and 10 on the left side of the mold 1, the property of the sensing devices 4 and 10 changes, so that the contact of the sensing devices 4, 10 on the left side of the mold 1 can be measured by the measurement device 5 on the left side of the mold 1. If for instance, at the same time, the resin has not yet reached the position of the sensing devices 4, 10 on the right hand side of the mold 1, the measurement device 5 on the right hand side of the mold 1 does not measure a change in the property of the sensing devices 4, 10 on the right hand side of the mold 1.

Figure 7:
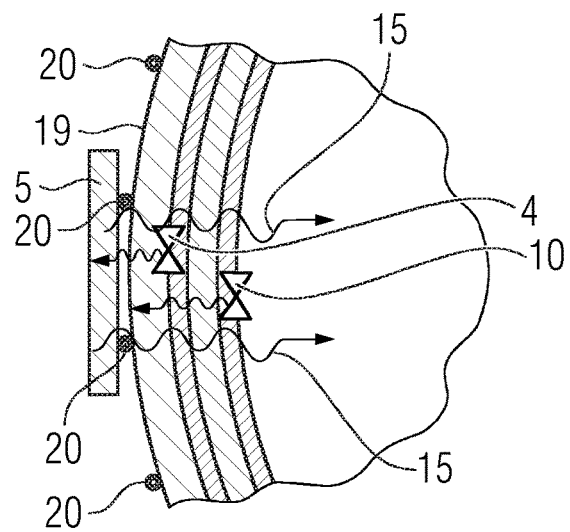
FIG. 7 depicts a cut view of a mold illustrating a step of an embodiment of a method according to the present invention.

As it is depicted in FIG. 7, the sensing devices 4, 10, which are provided as RFID elements, are passively powered by the measurement device 5, in particular by an electromagnetic field emitted from the measurement device 5, as indicated by the arrows 15. This has the advantage that the sensing devices 4, 10 do not have to contain a power source by themselves, so that no batteries or the like have to be included in the sensing devices 4, 10.

The RFID elements used as sensing devices 4 each comprise an antenna, which absorbs part of the energy emitted from the measurement device 5 and send back a signal to the measurement device 5, wherein a contact of the sensing device 4, 10 with the resin, can be detected as a change in the RF impedance of the antenna of the respective sensing device 4, 10. Also, a combination of passively powered sensing devices 4 and actively powered sensing devices is possible, in particular if for some of the sensing devices are arranged in a larger distance to the measurement device, for instance in between the mandrels 11, so that an active transmission of actively powered sensing devices may be used to bridge the distance to the measurement devices 5.

It is possible that at an outer surface 19 of the mold 1, one or more heating pipes 20 of a heater of the mold 1 are arranged, wherein depending on the position of the measurement device 5, a correction of the received signals from the sensing devices 4, 10 is conducted taking into account the obstruction by the heating pipes 20.

Figure 8:
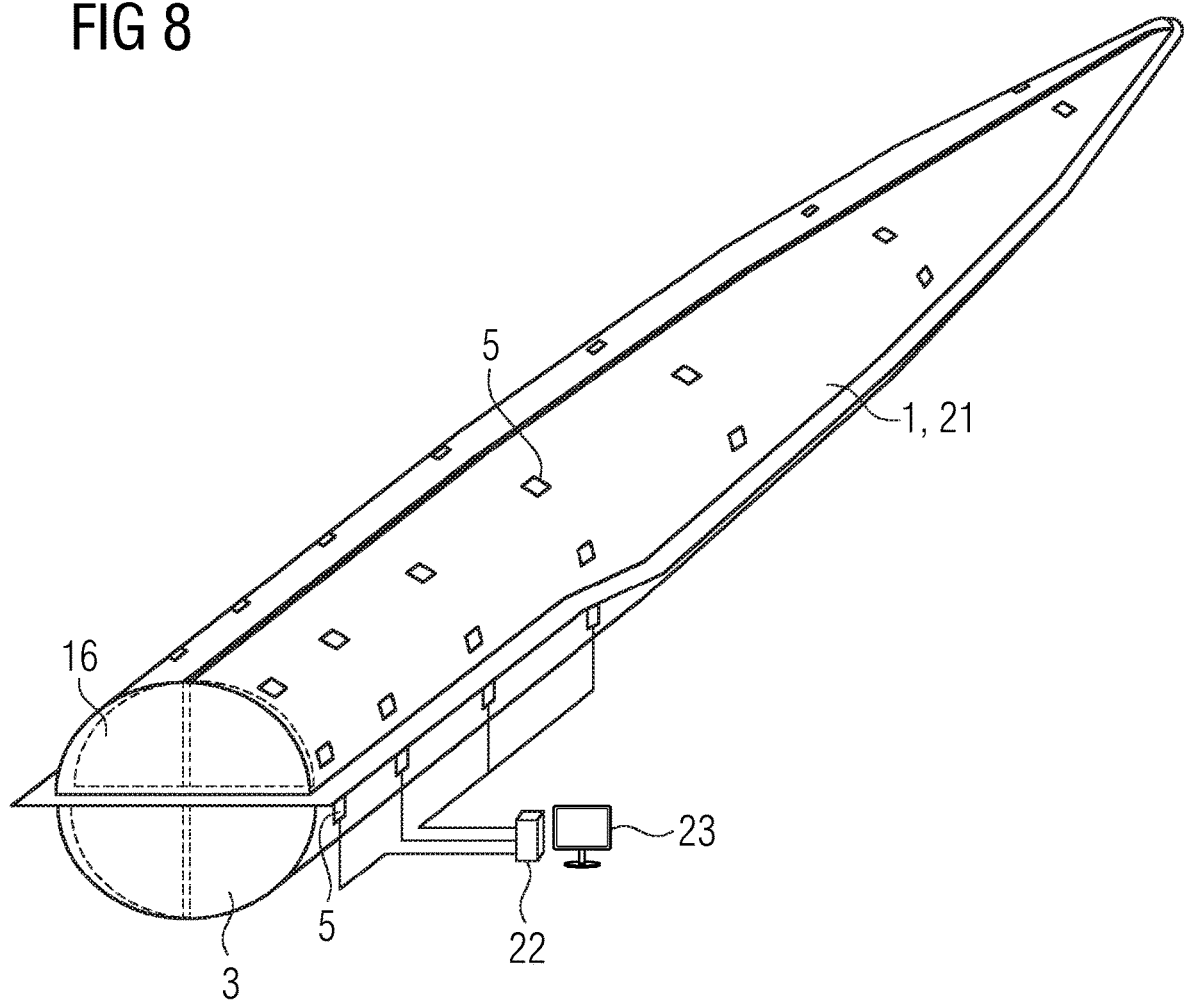
FIG. 8 depicts a perspective view of the mold.

In FIG. 8, a perspective view of the mold 1 is shown, wherein as a component casted inside the mold 1, a wind turbine blade 21 is fabricated. On the outer surface of the mold 1, a plurality of measurement devices 5 is arranged, each adjacently to one or more sensing devices 4 attached to the mold 1 and/or to the component 7 and/or to one further sensing device 10 attached to a further component 9.

The measurement devices 5 are each connected to a computing device 22, wherein the computing device 22 determines a temperature and/or a resin distribution information describing the resin distribution in the mold 1 and/or in the at least one component 7, or the further component 9, respectively. Therefore, all measurement devices 5 are connected to the computing device 22 (not all connections shown), so that the temperature and/or the resin distribution can be determined with a sufficient spatial resolution.

It is possible that the computing device 22 is connected to at least one valve of a further inlet (not shown) of the mold 1 used for providing resin to the mold 1. This allows for controlling the resin infusion into the mold 1 by subsequently opening of the valves of one or more further inlets of the mold 1, so that for instance the entrapment of air inside the mold during the casting process can be avoided. Furthermore, the computing device 22 may comprise a display unit 23, on which the resin distribution information is depicted. The computing device 22 also controls the heater of the mold 1 to heat the heating pipes 20 in dependence of the temperature determined using the sensing devices. The sensing devices 4, 10 may be regularly used to determine the temperature and/or the resin distribution in the mold 1, for instance once every minute.

It is possible that the sensing devices 4, 10 each comprise a temperature measurement unit, which determines a temperature information corresponding to a temperature of the sensing device 4, 10. The temperature information can be transmitted to the measurement devices 5 during a read-out process of the sensing devices 4, 10 and sent to the computing device 22. The temperature measurement using the temperature measurement unit of the sensing devices 4, 10 may be conducted in addition or alternatively to a temperature measurement using a temperature-dependent change in a property of the sensing elements 4, 10. The sensing devices 4, 10 and/or the measurement devices 5 comprises a temperature accuracy of at least 1° C. by evaluating the property of the sensing device and/or by using the temperature measurement unit of the sensing device 4, 10, respectively.

It is possible that the sensing devices 4, 10 each comprise an identification unit, which provides an identification information specific to the sensing device 4, 10, a pressure measurement unit, which determines a pressure information corresponding to a pressure acting on the sensing device 4, 10 and/or a capacity measurement unit, which determines a capacitance information corresponding to an electrical capacitance of a vicinity of the sensing device 4, 10.

Also, the identification information, the pressure information and/or the capacitance information can be read out by the measurement devices 5 and in particular also be sent to the computing device 22. The additional information obtained at the computing device 22 may be displayed on the display unit 23, so that for instance an operator can control the information or the parameters described by the information, respectively.

Additionally or alternatively to the measurement devices 5 attached to the outer surface of the mold 1, hand held devices can be used as measurement devices 5 to measure the property of the sensing devices 4, 10 that changes when the sensing device 4, 10 comes into contact with the resin. This allows for instance for using an increased number of sensing devices 4, 10 in production processes of prototypes and/or during production tests, so that not for each of the sensing devices 4, 10 arranged inside the interior 2 of the mold 1, a measurement unit 5 has to be mounted to the exterior of the mold 1.

Figure 9:
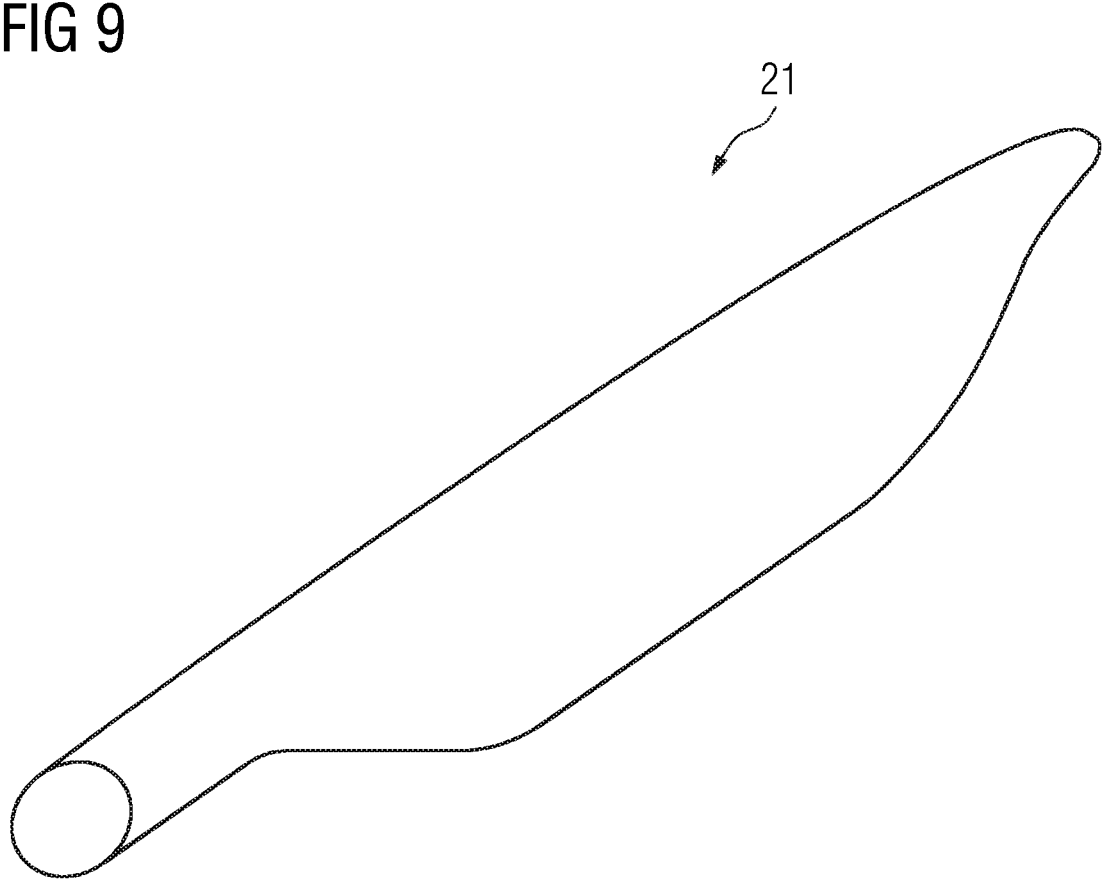
FIG. 9 depicts a wind turbine blade according to the present invention.

In FIG. 9, a wind turbine blade 21 fabricated in a method according to the present invention is shown. It is possible that the wind turbine blade 21 comprises one or more of the sensing devices 4, 10 on an exterior or interior surface of a shell structure of the wind turbine blade 21 and/or in between the components forming the shell structure of the wind turbine blade 21.

Although the present invention has been described in detail with reference to the preferred embodiment, the present invention is not limited by the disclosed examples from which the skilled person is able to derive other variations without departing from the scope of the invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for fabricating a member in a resin-infusion-based casting process, in which at least one component forming the member is infused with a resin, the method comprising:
   providing a mold, the at least one component, the resin, at least one measurement device and at least one sensing device, wherein the at least one sensing device has at least one property which changes measurably with temperature and/or when the at least one sensing device comes into contact with the resin;
   attaching the at least one sensing device with a flexible substrate to an inner surface of the mold and/or to the at least one component;
   arranging the at least one component inside the mold;
   providing the resin to at least one inlet of the mold; and
   wirelessly measuring and evaluating the at least one property of the at least one sensing device with the at least one measurement device for monitoring a temperature and/or a distribution of the resin in the mold and/or in the at least one component.

2. The method according to claim 1, wherein a plurality of sensing devices is arranged at different locations at the mold and/or at the at least one component.

3. The method according to claim 1, wherein after arranging the component in the mold, at least one further component and/or a supporting element is arranged on the component, wherein at least one further sensing device is attached to the at least one further component and/or to the supporting element opposite to the at least one sensing device or to at least one of the sensing devices attached to the mold and/or the at least one component.

4. The method according to claim 2, wherein the at least one measurement device is arranged to an outer surface of the mold opposite to the at least one sensing device or to at least one of the plurality of sensing devices, and/or that at least one hand-held device is used as measurement device.

5. The method according to claim 1, wherein the at least one sensing device is passively powered by energy provided by the at least one measurement device in a form of an electromagnetic field.

6. The method according to claim 1, wherein a radio frequency identification element is used as the at least one sensing device and that a radio frequency identification reader is used as the at least one measurement device.

7. The method according to claim 6, wherein a radio frequency impedance of the radio frequency identification element of an antenna of the radio frequency identification element, is used as property of the radio frequency identification element.

8. The method according to claim 1, wherein the at least one sensing device comprises a temperature measurement unit, which determines a temperature information corresponding to a temperature of the at least one sensing device, an identification unit, which provides an identification information specific to the at least one sensing device, a pressure measurement unit, which determines a pressure information corresponding to a pressure acting on the at least one sensing device, and/or a capacity measurement unit, which determines a capacitance information corresponding to an electrical capacitance of a vicinity of the at least one sensing device, wherein the at least one measurement device reads the temperature information, the identification information, the pressure information and/or the capacitance information from the at least one sensing device.

9. The method according to claim 1, wherein the flexible substrate comprises an adhesive surface, further wherein the flexible substrate is used to attach the at least one sensing device to the inner surface of the mold and/or to the component.

10. The method according to claim 1, wherein the at least one measurement device is connected to a computing device, the computing device controls a heater of the mold in dependence of a temperature measured using the at least one sensing device and/or determines a resin distribution information describing the resin distribution in the mold and/or in the at least one component, and/or wherein the computing device controls at least one valve of a further inlet of the mold used for providing resin to the mold.

11. The method according to claim 1, wherein the mold comprises at least two parts completely enclosing an interior of the mold.

12. The method according to claim 11, wherein a vacuum is applied at least to the interior of the mold during provision of the resin.

13. The method according to claim 1, wherein a glass fiber mat is used as component and/or as further component and/or that a core component is arranged in between component and the further component, wherein the core component is balsa wood.

14. The method according to claim 1, wherein the member is a wind turbine blade.

15. A method of fabricating a turbine blade, the method comprising:
   providing a mold for fabricating the turbine blade, the at least one component, the resin, at least one measurement device and at least one sensing device, wherein the at least one sensing device has at least one property which changes measurably with temperature and/or when the at least one sensing device comes into contact with the resin;
   attaching the at least one sensing device with a flexible substrate to an inner surface of the mold and/or to the at least one component;
   arranging the at least one component inside the mold;
   providing the resin to at least one inlet of the mold; and
   wirelessly measuring and evaluating the at least one property of the at least one sensing device with the at least one measurement device for monitoring a temperature and/or a distribution of the resin in the mold and/or in the at least one component.

\* \* \* \* \*